United States Patent
Gupte et al.

(10) Patent No.: US 10,681,116 B2
(45) Date of Patent: Jun. 9, 2020

(54) PROVIDING SERVICES AS RESOURCES FOR OTHER SERVICES

(71) Applicant: HEWLETT PACKARD ENTERPRISE DEVELOPMENT LP, Houston, TX (US)

(72) Inventors: Prashant Gupte, Sunnyvale, CA (US); Matthew S. Newman, Sunnyvale, CA (US); Stephane Herman Maes, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 426 days.

(21) Appl. No.: 14/914,286

(22) PCT Filed: Sep. 4, 2013

(86) PCT No.: PCT/US2013/058043
§ 371 (c)(1),
(2) Date: Feb. 25, 2016

(87) PCT Pub. No.: WO2015/034485
PCT Pub. Date: Mar. 12, 2015

(65) Prior Publication Data
US 2016/0219097 A1    Jul. 28, 2016

(51) Int. Cl.
*H04L 29/08* (2006.01)
*G06F 9/50* (2006.01)

(52) U.S. Cl.
CPC ............ *H04L 67/10* (2013.01); *G06F 9/5027* (2013.01); *G06F 9/5061* (2013.01); *H04L 67/16* (2013.01)

(58) Field of Classification Search
CPC ....... H04L 67/10; H04L 67/16; G06F 9/5061; G06F 9/5027
See application file for complete search history.

(56) References Cited

U.S. PATENT DOCUMENTS 6,799,208 B1 * 9/2004 Sankaranarayan ....... G06F 9/50
                                                       709/223
6,901,446 B2    5/2005 Chellis et al.
(Continued)

FOREIGN PATENT DOCUMENTS

CN    1523844 A    8/2004
CN    101968859 A    2/2011
(Continued)

OTHER PUBLICATIONS

Foster, Ian. "The physiology of the grid: An open grid services architecture for distributed systems integration." (2002) (Year: 2002).*

(Continued)

*Primary Examiner* — Caroline H Jahnige
(74) *Attorney, Agent, or Firm* — Hewlett Packard Enterprise Patent Department

(57) ABSTRACT

Providing services can include receiving a request for a first service provided by a resource provider and provide a reference to an instantiated first resource that the resource provider instantiated. Providing services can include receiving a request for a second service provided by the resource provider. Providing services can include partitioning the instantiated first resource to create an instantiated second resource if the instantiated first resource is capable of providing the second service. Providing services can include registering an availability of the resource provider and the instantiated first resource for further partitioning in a chain of building blocks. Providing services can include updating one of the chain of building blocks and propagate the update to the chain of building blocks.

20 Claims, 7 Drawing Sheets

(56) References Cited

U.S. PATENT DOCUMENTS

| | | | |
|---|---|---|---|
| 7,461,166 B2 | 12/2008 | Doyle et al. | |
| 8,219,988 B2 | 7/2012 | Armstrong et al. | |
| 8,495,570 B2 | 7/2013 | Fortune et al. | |
| 8,504,691 B1 | 8/2013 | Tobler et al. | |
| 2002/0120744 A1* | 8/2002 | Chellis | G06F 9/50 709/226 |
| 2004/0167959 A1 | 8/2004 | Doyle et al. | |
| 2004/0167980 A1* | 8/2004 | Doyle | G06F 9/5072 709/225 |
| 2009/0118839 A1* | 5/2009 | Accapadi | G06F 21/53 700/28 |
| 2009/0288084 A1 | 11/2009 | Astete et al. | |
| 2010/0198730 A1 | 8/2010 | Ahmed et al. | |
| 2011/0179173 A1* | 7/2011 | Colrain | G06F 9/5061 709/226 |
| 2011/0289479 A1 | 11/2011 | Pletter et al. | |
| 2012/0185913 A1 | 7/2012 | Martinez et al. | |
| 2012/0324092 A1 | 12/2012 | Brown et al. | |
| 2012/0331524 A1 | 12/2012 | Mower et al. | |
| 2013/0007272 A1 | 1/2013 | Breitgand et al. | |
| 2013/0036213 A1 | 2/2013 | Hasan et al. | |
| 2013/0042004 A1 | 2/2013 | Boss et al. | |
| 2013/0060933 A1 | 3/2013 | Tung et al. | |
| 2013/0066945 A1 | 3/2013 | Das et al. | |

FOREIGN PATENT DOCUMENTS

| | | |
|---|---|---|
| CN | 102281290 A | 12/2011 |
| CN | 102713849 A | 10/2012 |
| CN | 102981890 A | 3/2013 |
| WO | WO2014007810 | 1/2014 |
| WO | WO2014088544 | 6/2014 |
| WO | WO2015034481 | 3/2015 |
| WO | WO2015034484 | 3/2015 |
| WO | WO2015034485 | 3/2015 |
| WO | WO2015034487 | 3/2015 |

OTHER PUBLICATIONS

Chapman, C. et al., Software Architecture Definition for On-demand Cloud Provisioning, Sep. 12, 2010, 21 pages, http://www.ee.ucl.ac.uk/~sclayman/docs/ClusterComp2011.pdf.
Cisco Systems, Inc., Glue Networks Deployment Guide for the Cisco Next-generation WAN, May 1, 2013, 29 pages http://www.cisco.com/en/US/docs/solutions/Enterprise/WAN__and_MAN/GlueNtwksDepGuide.pdf.
International Search Report & Written Opinion, PCT Patent Application No. PCT/US2013/058043, dated Apr. 29, 2014, 9 pages.
Mietzner, R. et al., Towards Provisioning the Cloud: On the Usage of Multi-Granularity Flows and Services to Realize a Unified Provisioning Infrastructure for SaaS Applications, IEEE Congress on Services, Mar. 11, 2009, 8 pages.
Tsai, W-T et al., Service-oriented Cloud Computing Architecture, 2010 7th International Conference on Information Technology, Apr. 12-14, 2010, 10 pages.
VMware, Inc., VMware vCloud ® Architecture Toolkit Operating a VMware vCloud, Oct. 2011, 92 pages http://www.vmware.com/files/pdf/vcat/Operating-VMware-vClould.pdf.

* cited by examiner

PROVIDING SERVICES AS RESOURCES FOR OTHER SERVICES

CROSS-REFERENCE TO RELATED APPLICATION

This application is a U.S. National Stage Application of and claims priority to international Patent Application No. PCT/US2013/0584043, filed on Sep. 4, 2013, and entitled "PROVIDING SERVICES AS RESOURCES FOR OTHER SERVICES".

BACKGROUND

A cloud service generally refers to a service that allows end recipient computer systems to access a pool of hosted computing and/or storage or networking resources over a network and/or capabilities offered on demand built on these. A cloud service may provide Software as a Service (SaaS), Infrastructure as a Service (IaaS), and/or Platform as a Service (PaaS), among other services. A cloud service may offer public services and/or private services as requested by a customer.

DETAILED DESCRIPTION

Figure 1:
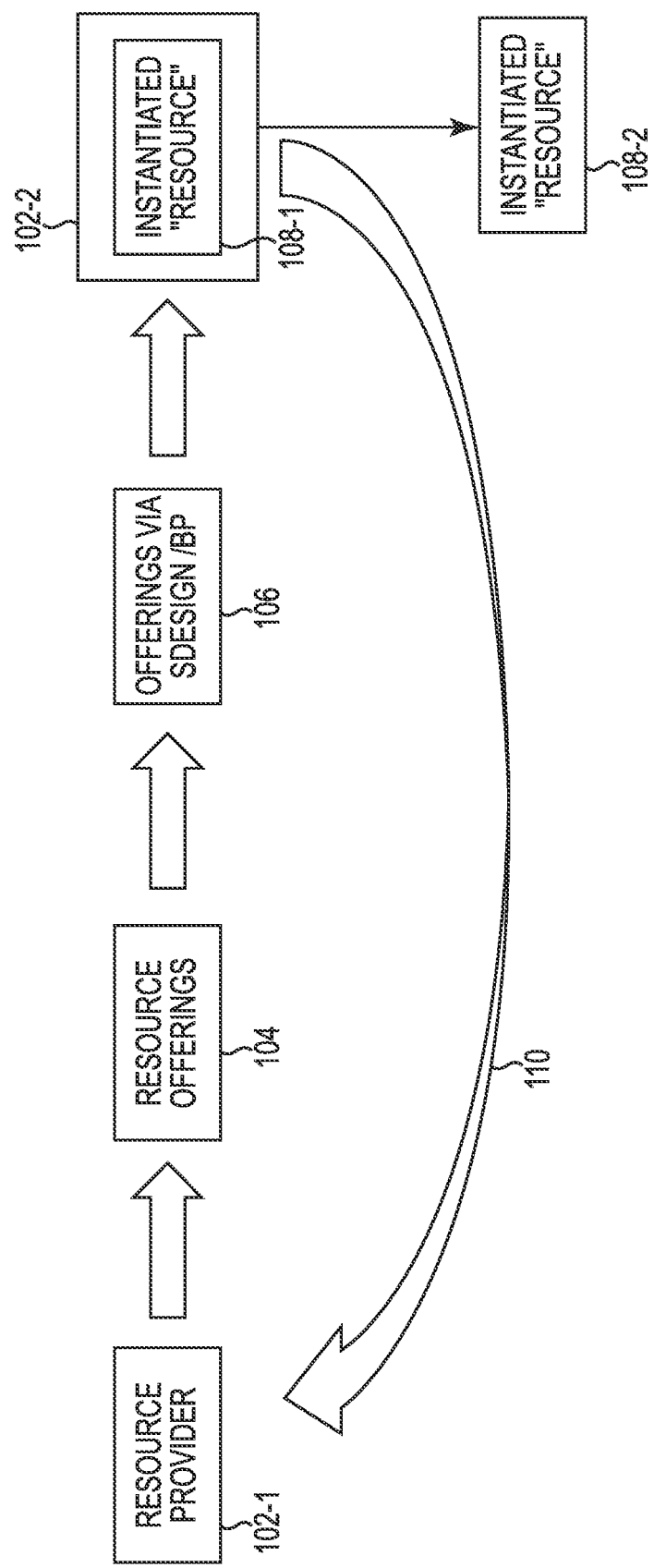
FIG. 1 illustrates a flow diagram of an example of providing resources according to the present disclosure.

For cloud based provisioning systems whole resource units, e.g., server, storage, network security, application installed, are provided as a service. In previous approaches, a service may be provisioned for a user by reserving and/or partitioning the entire instance of the service and all dependent supporting services. That is, the partitioned service and all dependent supporting services are not divided and a user can use the entire partitioned service.

In a number of examples, a service can be provisioned for a user by reserving and/or partitioning a portion of the instance of the service and/or a portion of all dependent supporting services. Provisioning by partitioning the entire instance of the service can be accomplished with fewer computation steps than provisioning a portion of the instance of the service. However, an instance of the service can be shared and the dependent supporting services can be shared by provisioning a first portion of the instance of the service to a first user and by provisioning a second portion of the instance of the service to the first use and/or to a second user.

For example, in a number of examples, a user can request a first number of resources through an application. A resource provider can instantiate the resources and provide the user with the instantiated first resources. The user can subsequently request a second number of resources. The second number of resources can be instantiated by the instantiated first resources that function as a different resource provider to conserve resources. The instantiated first resources can be divided, e.g., partitioned, to conserve resources rather than allocating a different number of resources for the instantiated second number of resources. As such, the instantiated first number of resources and the instantiated second number of resources can share resources while being independent and isolated from each other.

Partitioning a first number of instantiated resources into a first number of instantiated resources and a second number of instantiated resources can provide for improved utilization of resources over creating a first number of instantiated resources and a second number of instantiated resources that do not share resources. As used herein, a user can be a customer and/or an application through which a customer makes a number of requests. An application refers to machine-readable instructions, e.g., software, firmware, etc., that can be run on hardware processor, memory, etc., to process a number of requests and forward the requests through a network to a resource provider. In a number of examples, an application can be an end user application and/or an application that manages a number of resources. A resource can be a physical resource and/or a logical resource. For example, a resource can include Software as a Service (SaaS), Infrastructure as a Service (IaaS), and/or Platform as a Service (PaaS). Other examples of resources are discussed in conjunction with FIGS. 1-7.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a flow diagram of an example of providing resources according to the present disclosure. FIG. 1 includes a resource provider 102-1, resource provider 102-2, resource offerings 104, service design 106, instantiated resource 108-1, and instantiated resource 108-2. As used herein, the service design 106 can be referred to as a blue print 106.

An application and/or a user can request a first number of resources from a resource provider 102-1. A resource provider can be a physical provider and/or a logical provider that creates, organizes, or reserves an instantiated resource for an application's, e.g., a consumer's, use. For example, a resource provider 102-1 can be an access layer switch that is capable of configuring specific ports to allow network traffic to traverse the specific ports. The access layer switch can be the resource provider and the configuration of the specific ports, e.g. closing and/or opening the ports, can be the resource, e.g., service, that the access layer provides. Other examples of resource provider and resource pairs can include a virtual center that instantiates virtual machines (VM) and/or a storage automation tool that creates storage containers.

The resource provider 102-1 can identify a number of resource offerings 104 that an application can invoke in an instantiated resource 108. Resource offerings 104 are capabilities that are associated with an instantiated resource 108-1. Capabilities can include creating and/or modifying the instantiated resource 108-1. Capabilities can include starting and/or stopping the instantiated resource 108-1, among other capabilities. As used herein, the term capabilities is intended to be inclusive. Capabilities are specific to the instantiated resource 108-1. For example, if an instantiated resource 108-1 is a database, then capabilities can include creating a database, populating the database, modifying the database, and/or restructuring the database, among other capabilities associated with a database.

After the number of resource offerings 104 are identified, the service design 106 can be created. The service design 106 is a topology, blueprint, and/or workflow that allows the application to provision and then manage the instantiated resource 108-1 by describing, e.g., orchestrating, the steps required to do so, e.g., to perform a particular life cycle management action.

An instantiated resource 108-1 and an instantiated resource 108-2 can be an instantiation of the requested resource. A resource or requested resource is a resource that has not been instantiated. For example, a requested resource can be a server while the instantiated resource can be an instantiation of the server. The instantiated resource 108-1 can be created based on a number of specifications that are provided with the request for resources made by the application. Examples of the instantiated resource 108-1 can include an operating system, a server, and/or a network connection, among other examples of the instantiated resource 108-1. In a number of examples, an instantiated resource 108-1 can perform a number of logical and/or hardware functions. The instantiated resource 108-1 can consume a number of other instantiated resources, e.g., hardware and/or logical resources. For example, an instantiated resource 108-1 that is a server can consume a number of memory resources to provide a number of functions.

In previous approaches, each time a service is requested a resource is instantiated by allocating unused resources to the instantiated resource. For example, an application can request a first server and the resource provider 102 can create an instantiated resource 108-1 that is a first server that consumes a first memory, a first number of network connections, and a first operating system, among other instantiated resources. The application can request a second server and the resource provider 102 can create a different instantiated resource that is a second server. The second server can consume a second memory, a second number of network connections, and a second operating system. That is, in previous approaches, a new set of instantiated resources, e.g., a memory, a number of network connections, and an operating system, are reserved for a server each time a server is instantiated. As such, a different number of instantiated resources can be reserved for the second instantiated resource even through the initial number of instantiated resources that are reserved for the first instantiated resource 108-1 remain underutilized. However, in a number of examples of the present disclosure, a second instantiated resource can share the initial number of instantiated resources with the first instantiated resource 108-1 by partitioning the first instantiated resource 108-1.

In a number of examples, resource provider 102-1 can create an instantiated resource 108-1 as described above. The instantiated resource 108-1 can use a number of instantiated resources to provide a number of functions to an application that requested the instantiated resource 108-1. In a number of examples, the instantiated resource 108-1 can be partitioned to create the instantiated resource 108-1 and an instantiated resource 108-2. That is, the number of instantiated resources that a instantiated resource 108-1 uses can be partitioned such that a first portion of the number of instantiated resources are used by the instantiated resource 108-1 and a second portion of the number of instantiated resources are used by the instantiated resource 108-2.

For example, instantiated resource 108-1 can be a database. The database can be partitioned such that instantiated resource 108-2 can be a schema supported by the database, e.g., instantiated resource 108-1. As such, the instantiated resources that the database, e.g., instantiated resource 108-1, uses can be partitioned and divided between instantiated resource 108-1 and instantiated resource 108-2 to provide isolated user access to the database and/or the schemas associated with the database. That is, the instantiated resource 108-2 can be a partition of the database without requiring that new instantiated resources be allocated to support a different database for the instantiated resource 108-2. Using a single database to provide instantiated resource 108-1 and instantiated resource 108-2 can conserve resources over creating two different databases particularly if the two different databases are underutilized.

The instantiated resource 108-1 and the instantiated resource 108-2 can be partitioned by a resource provider 102-2. The instantiated resource 108-1 can be and/or act as a resource provider 102-2. In a number of examples, the instantiated resource 108-1 can be independent of resource provider 102-2 and/or the instantiated resource 108-1 can be included in the resource provider 102-2.

Creating the resource provider 102-2 can include registering 110 the resource provider 102-2 with the resource provider 102-1. In a number of examples, creating the resource provider 102-2 can include registering 110 the resource provider 102-2 with an application that requested the instantiated resource 108-1 and/or the instantiated resource 108-2.

Registering 110 the resource provider 102-2 can include registering the capabilities and/or functions associated with the instantiated resource 108-1 and/or the instantiated resource 108-2. Registering 110 the resource provider 102-2 can include registering a type of the resource provider 102-2 or a type of the instantiated resource 108-1 and the instantiated resource 108-2. For example, a type can be a database type, a server type, a network connection type, and/or other descriptions of instantiated resources. Registering 110 can further include registering a number of parameters that further describe the instantiated resource 108-1 and the instantiated resource 108-2. For example, a parameter can be a structural query language (SQL) language element among other parameters that describe the resource provider 102-2 and/or the instantiated resource 108-1, e.g., a database.

Registering 110 the resource provider 102-2 can also include registering a number of commands that are associated with the instantiated resource 108-1 and/or the instantiated resource 108-2. Commands associated with the instantiated resources 108-1 and 108-2 can be commands that are used by an application to communicate with the instantiated resources 108-1 and/or 108-2.

Figure 2:
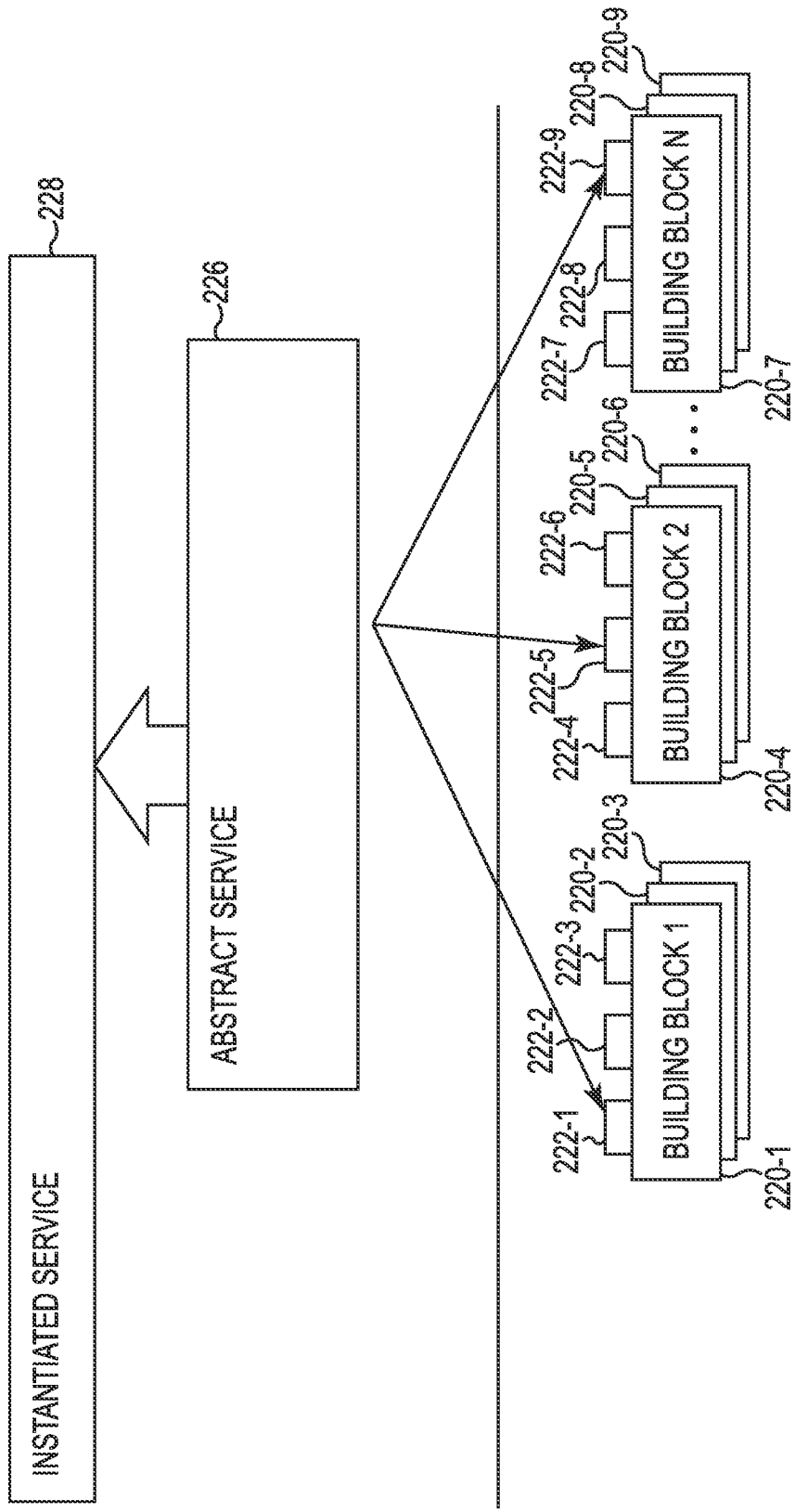
FIG. 2 illustrates a block diagram of an example of an instantiated service according to the present disclosure.

FIG. 2 illustrates a block diagram of an example of an instantiated service according to the present disclosure. FIG. 2 includes an instantiated service 228, an abstract service 226, and building blocks 220-1, 220-2, 220-3, 220-4, 220-5, 220-6, 220-7, 220-8, 220-9, e.g., referred to generally as building blocks 220. Examples are not limited to the number of building blocks 220 shown in FIG. 2.

Building blocks 220 are resource providers that are associated with a topology position in a topology of instantiated resources that provide a service to a user. For example, a topology of instantiated resources can be built in a top/down manner, e.g., from a root node, e.g., instantiated resource, to the leaf nodes, e.g., instantiated resource, and/or in a down/up manner, e.g., from the leaf nodes to a root node. A root node can represent a first level. The nodes that branch from the root node can represent a second level and so forth until the leaf nodes represent an Nth level. The topology of instantiated resources can describe a number of dependencies between the instantiated resources. In a number of examples, the topology of a number of instantiated resources can be extended to a topology of the building blocks that produced the instantiated resources. For example, building block 220-1, building block 220-2, and building block 220-3 represent a first level, building block 220-4, building block 220-5, and building block 220-6 represent a second level, and building block 220-7, building block 220-8, and building block 220-9 represent an Nth level.

Each of the building blocks 220 can create an instantiated resource. In a number of examples, a building block can be registered as and/or can constitute an instantiated resource. In a number of examples, the building blocks 220 can be used to create an instantiated building block. An instantiated building block is an instantiated resource that is associated with topology position, e.g., service design and/or blueprint. The functions and/or capabilities that are associated with instantiated resourced created by building blocks 220 are referred to as resource offerings. For example, building block 220-1 can create an instantiated resource that can provide a resource offering 222-1, a resource offering 222-2, and/or a resource offering 222-3. Building block 220-4 can create an instantiated resource that can provide a resource offering 222-4, a resource offering 222-5, and/or a resource offering 222-6. Building block 220-7 can create an instantiated resource that can provide a resource offering 222-7, a resource offering 222-8, and/or a resource offering 222-8. Building blocks 220 can create instantiated resources that can provide other resource offerings than those illustrated in FIG. 2.

The building blocks 220 can be used by a number of different applications and/or by a number of instances of an application. For examples, a first topology of instantiated resources can use a first building block to create a first instantiated resource. A second topology of instantiated resources can also use the first building block to create a second instantiated resource wherein the first instantiated resource and the second instantiated resource can depend on the same instantiated resources. That is, a number of topologies of instantiated resources can partition instantiated resources and use the instantiated resources in part and/or whole.

In a number of examples, a number of building blocks 220 can be created to instantiate a number of instantiated resources for an application, e.g., user using an application.

A request to generate a service can be received by the application and or a different application. The request can be analyzed to determine if the number of building blocks 220 can be used to create the requested service. The analysis can determine whether the building blocks 220 can create the type of service requested and/or if there are policy, security, tenancy, and/or other contextual considerations that preclude the creation of the requested service. If it is determined that the building blocks 220 can instantiate the requested service then the requested service is instantiated from the building blocks 220. If it is determined that the building blocks 220 cannot instantiate the requested service, then a new building block is created and the requested service is instantiated from the new building block.

For example, if a request is received for operating system services, then the number of building blocks 220 can be analyzed to determine whether the number of building blocks 220 can instantiate the operating system services given the policy, security, tenancy, and/or other contextual considerations. If the building blocks 220 can instantiate operating system services and if there are no policy, security, tenancy, and/or other contextual consideration, then the operating system services are instantiated from the number of building blocks 220. If the building blocks 220 cannot instantiate operating system service, because, for example, the building blocks 220 instantiates database related services and/or because there are policy, security, tenancy, and/or other contextual considerations, then a new building block that instantiates operating system services and that is consistent with the policy, security, tenancy, and/or other contextual considerations can be created to fulfill the request for operating system services.

The abstract service 226 can be modeled, or managed using a model, based on a topology, e.g., service design and/or blueprint. A topology can define a number of dependencies between the instantiated resources and/or the instantiated building blocks that are created from building blocks 220 that belong to different levels. A topology of instantiated resources can define dependencies and/or connections between a first instantiated resource created from the building block 220-7 and a second instantiated resource created from the building block 220-4, for instance. For example, a topology can define the dependencies between an operating system that is the first instantiated resource and an application that runs on the operating system that is the second instantiated resource.

The instantiated service 228 is provided to an application. The instantiated service 228 is modeled or described by a realized topology. As used herein, the instantiated service 228 can be used by an application that is offered to the user and/or by an application that is directly used by the user. That is, the instantiated service 228 can be directly and/or indirectly used by the user.

In a number of examples, policy based selection of resources for a cloud service can be implemented in a cloud service management system (e.g., HP Cloud Service Automation (CSA), for instance). The cloud service management system can orchestrate the deployment of compute and infrastructure resources and complex multi-tier application architectures. In a number of examples, the cloud service management system can include a catalog-based subscription process. For instance, a subscriber can request particular cloud service offerings to be implemented in a cloud service. In some examples, a subscriber can modify predefined cloud service offerings, wherein the predefined cloud service offerings include pricing and other customer-specific features.

Figure 3:
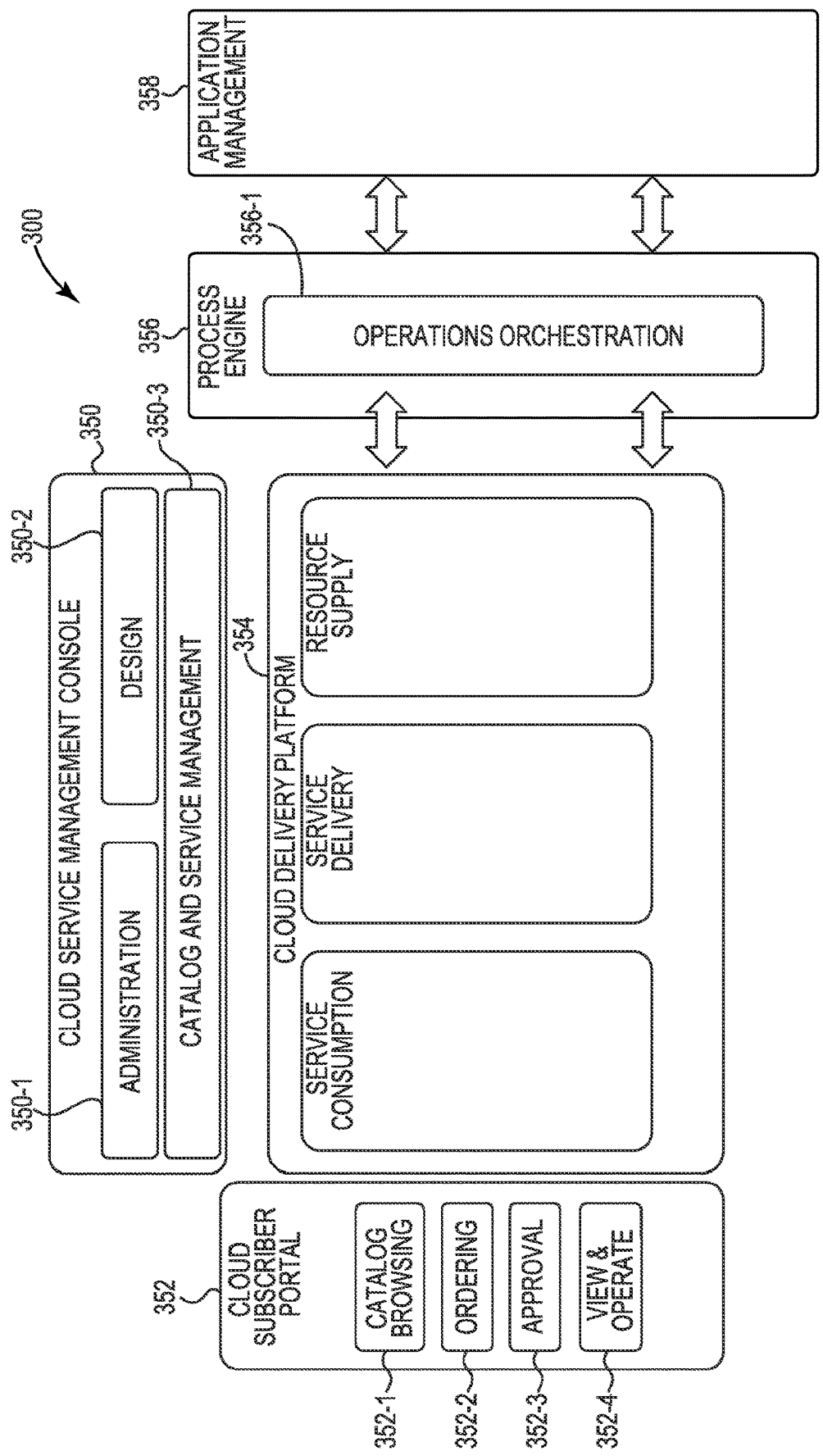
FIG. 3 illustrates a block diagram of an example of an environment for creating an instantiated service for a cloud service provisioning system according to the present disclosure.

FIG. 3 illustrates a block diagram of an example of an environment for creating an instantiated service for a cloud service provisioning system according to the present disclosure. As shown in FIG. 3, a cloud service management system 300 can include a number of different architectural components. For instance, the cloud service management system 300 can include a cloud service management portal 350, a cloud subscriber portal 352, a cloud delivery portal 354, a process engine module 356, and a number of application management modules 358.

The cloud service management portal 350 can include hardware and/or a combination of hardware and programming to perform a number of different functions to manage cloud services. For instance, the cloud service management portal 350 can perform administrative functions and design functions. The cloud subscriber portal 352 can include hardware and/or a combination of hardware and programming to perform a number of different functions supporting a cloud subscriber. For example, the cloud subscriber portal can perform functions allowing a cloud subscriber to browse a cloud service catalog, order cloud services, approve cloud service offerings, and/or view subscriptions.

The cloud delivery platform 354 can include hardware and/or a combination of hardware and programming to perform a number of different functions to deliver cloud services. For instance, the cloud delivery platform 354 can include a service consumption sub-module including information on cloud service pricing, a catalog of cloud services available, a number of offerings, and/or subscriptions to cloud services. Similarly, the cloud service delivery platform 354 can include a service delivery sub-module that can include information on service blueprints, cloud service components, instances, and/or bindings. Further, the cloud service delivery platform 354 can include a resource supply sub-module that can include information on resource pools, cloud service providers, cloud service offerings, and/or cloud service subscriptions.

In a number of examples, the cloud management system 300 can include a process engine 356. The process engine 356 can include hardware and/or a combination of hardware and programming to orchestration cloud service management operations. For instance, process engine 356 can provide a number of instantiated resources recursively, e.g., partitioning a first instantiated resource to provide a second instantiated resource, as illustrated in FIGS. 1-2, and 4-7. In a number of examples, process engine 356 can use a resource provider to select service providers based on a number of different policies. For example, a request for a service can be received. It can be determined whether an already existing resource provider can provide the service. An instantiated resource, that was instantiated by the resource provider, can be partitioned to create a new instantiated resource, if the resource provider can provide the requested service. A new resource provider can be created if the resource provider cannot provide the requested service. The new resource provider can be used to create the new instantiated resource. A number of instantiated resources can be used as building blocks to provide a service. The availability for partitioning of the number of instantiated resources together with their associated resource providers can be registered as a chain of building blocks. The chain of building blocks can be managed as a lifecycle of the service by updating changes made to any one of the chain of building blocks to the entire chain of building blocks.

Figure 4:
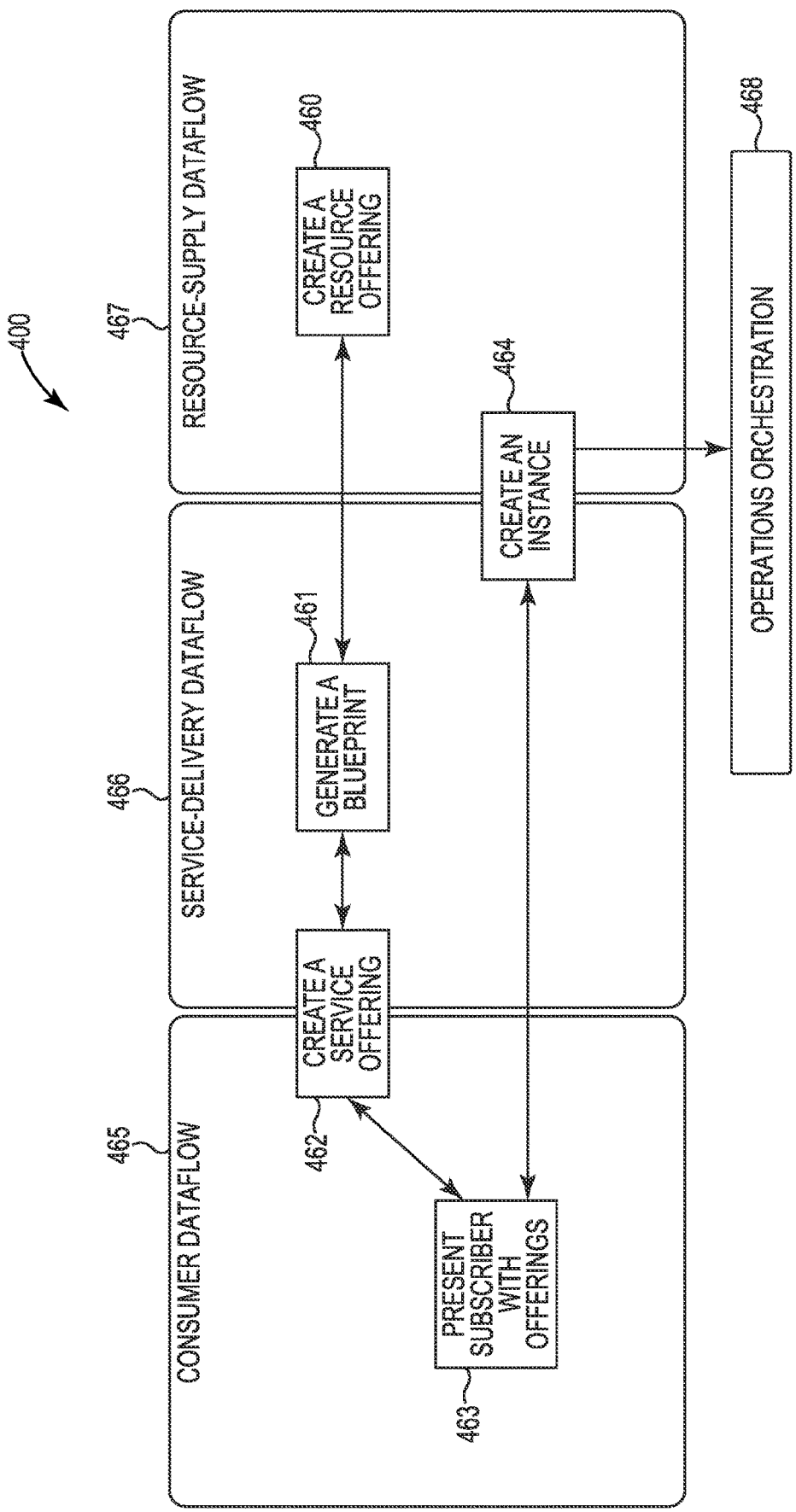
FIG. 4 illustrates a flow diagram of an example of selecting resources for a cloud service according to the present disclosure.

FIG. 4 illustrates a flow diagram of an example of selecting resources for a cloud service according to the present disclosure. As shown in FIG. 4, a cloud service management system 400 can manage the flow of information between a subscriber, e.g., consumer, user, and/or application, a cloud service, and resource providers. For example, at 460, the cloud service management system 400 can generate a resource offering. Generating a resource offering can include creating and/or importing resource offerings from underlying resource providers. At 461, the cloud service management system 400 can generate a service blueprint. Generating a service blueprint can include designing a cloud service, including the configuration, topology, behaviors, resource bindings, and/or service options included in the cloud service. At 462, the cloud service management system 400 can create a service offering. Creating a service offering can include defining pricing for the particular cloud service, defining a number of options related to the cloud service, defining default options related to the cloud service, and/or defining service level agreement (SLA) documents related to the cloud service, for instance.

At 463, the cloud service management system 400 can present a subscriber with service offerings for review, approval, and subscription. At 464, the cloud service management system 400 can create an instance of the particular service offerings. Creating an instance of the particular service offerings can include selecting a service component, binding a resource to provide the cloud service, and/or generating a resource subscription. In a number of examples, the instance of the particular service offering and/or the resource subscription for the particular service offerings can be sent to an operations orchestrator for implementation.

In some examples, a resource provider can partition an instantiated resource to create a number of instantiated resources. If a resource provider cannot provide a requested service than a new resource provider can be created. The new resource provider can instantiate a resource that provides the requested service. An availability of the resource provider and the instantiated first resource for further partitioning can be registered in a chain of building blocks. A portion of the chain of building blocks can be updated. The update can be propagated to the entire chain of building blocks.

Figure 5:
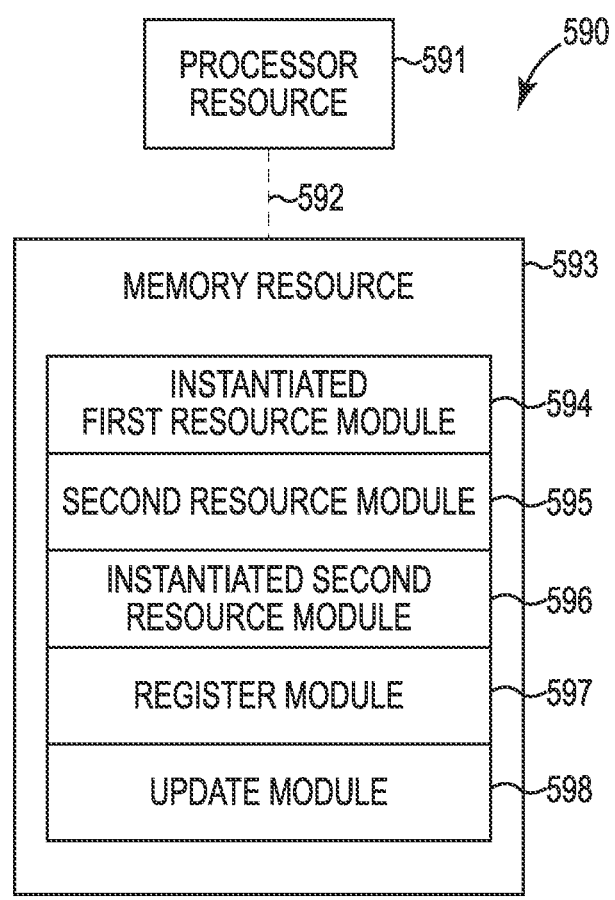
FIG. 5 illustrates a block diagram of an example of a computing device according to the present disclosure.

FIG. 5 illustrates a diagram of an example of a computing device according to the present disclosure. The computing device 590 can utilize software, hardware, firmware, and/or logic to perform a number of functions described herein.

The computing device 590 can be any combination of hardware and program instructions configured to instantiate a number of resources. The hardware, for example can include a processing resource 591 and/or a memory resource 593, e.g., machine readable medium (MRM), database, etc. A processing resource 591, as used herein, can include any number of processors capable of executing instructions stored by a memory resource 593. The processing resource 591 may be integrated in a single device or distributed across multiple devices. The program instructions, e.g., machine-readable instructions (MRI), can include instructions stored on the memory resource 593 and executable by the processing resource 591 to implement a desired function, e.g., provide a number of resources.

The memory resource 593 can be in communication with a processing resource 591. A memory resource 593, as used herein, can include any number of memory components capable of storing instructions that can be executed by processing resource 591. Such memory resource 593 can be a non-transitory MRM. The memory resource 593 may be integrated in a single device or distributed across multiple devices. Further, the memory resource 593 may be fully or partially integrated in the same device as the processing resource 591 or it may be separate but accessible to that device and processing resource 591. Thus, it is noted that the computing device 590 may be implemented on a participant device, on a server device, on a collection of server devices, and/or on a combination of the participant device and the server device.

The memory resource 593 can be in communication with the processing resource 591 via a communication link, e.g., path, 592. The communication link 592 can be local or remote to a machine, e.g., a computing device, associated with the processing resource 591. Examples of a focal communication link 592 can include an electronic bus internal to a machine, e.g., a computing device, where the memory resource 593 is one of volatile, non-volatile, fixed, and/or removable storage medium in communication with the processing resource 591 via the electronic bus.

A number of modules 594, 595, 596, 597, 598 can include MRI that when executed by the processing resource 591 can perform a number of functions. The number of modules 594, 595, 596, 597, 598 can be sub-modules of other modules. For example, the second resource module 595 and the instantiated second resource module 596 can be sub-modules and/or contained within the same computing device. In another example, the number of modules 594, 595, 596, 597, 598 can comprise individual modules at separate and distinct locations, e.g., MRM, etc.

Each of the number of modules 594, 595, 596, 597, 598 can include instructions that when executed by the processing resource 591 can function as a corresponding engine as described herein. For example, the instantiated first resource module 594 can include instructions that when executed by the processing resource 591 can function as a first resource engine.

In the example of FIG. 5, an instantiated first resource module 594 can comprise MRI that are executed by the processing resource 591 to receive a request for a first resource and to instantiate the first resource. A request can be received from an application or a consumer via an application. The application can be hosted on a consumer's computing device and/or on another computing system. In a number of examples, the application can give a request to create an instantiated resource, to destroy the instantiated resource, and/or to update the instantiated resource. The request can be received at a resource provider. A request can include a type of instantiated resource that is being requested and a number of parameters that further define an instantiated resource and/or a resource provider. Instantiating a resource can include providing, creating, selecting, and/or identifying the instantiated first resource. A first reference can include a reference to the instantiated first resource. A reference can be a link, a pointer, an address, and/or any other means by which the consumer and/or the application can communicate with the instantiated resource.

In a number of examples, the instantiated first resource can be provided to an application. The instantiated first resource can be provided to the application by creating the instantiated first resource on the computing device that hosts the application. The instantiated first resource can be provided to the application by moving the instantiated first resource to the computing device that hosts the application.

A different resource provider can be created from the instantiated first resource. In a number of examples, the instantiated first resource can be a different resource provider and/or the instantiated first resource can be independent of the different resource provider. A different resource provider is independent from the resource provider that created the instantiated first resource.

A second resource module 595 can comprise MRI that are executed by the processing resource 591 to receive a second request from the application for a second resource at the instantiated first resource. The request for the second resource at the instantiated first resource can include receiving the second request at the different resource provider. The second request can include a type of instantiated resource that is the same as the type of the first instantiated resource and/or the type of the different resource provider. The second request can also request resource offerings that the instantiated first resource and/or the different resource provider provide.

An instantiated second resource module 596 can comprise MRI that are executed by the processing resource 591 to provide to the application, by the instantiated first resource, a second reference of an instantiated second resource. The instantiated second resource can be created from a partition of the instantiated first resource by partitioning the instantiated first resource. The instantiated second resource and the instantiated first resource can support isolated access such that the instantiated first resource and the instantiated second resource are independent of each other.

A register module 597 can comprise MRI that are executed by the processing resource 591 to register an availability of the resource provider and the instantiated first resource for further partitioning in a chain of building blocks. An availability of an instantiated first resource and a resource provider for partitioning can include determining the current use of the instantiated first resource and comparing the current use with capability associated with the instantiated first resource.

An update module 598 can comprise MRI that are executed by the processing resource 591 to update a chain of building blocks. In a number of examples, one of the chain of building blocks can be updated. The update to any one of the chain building blocks can be propagated to the other building blocks in the chain of building blocks. For example, if a building block in the chain of building blocks is deleted, then the deletion can be propagated to building blocks that depended from the deleted building block by deleting the dependent building blocks.

In a number of examples, the request for the first resource and the request for the second resource can originate with a single application and/or can originate from a number of applications that are associated with a single consumer. Furthermore, the requests for the first resource and the request for the second resource can originate with a number of different applications that are associated with a number of different consumers.

Figure 6:
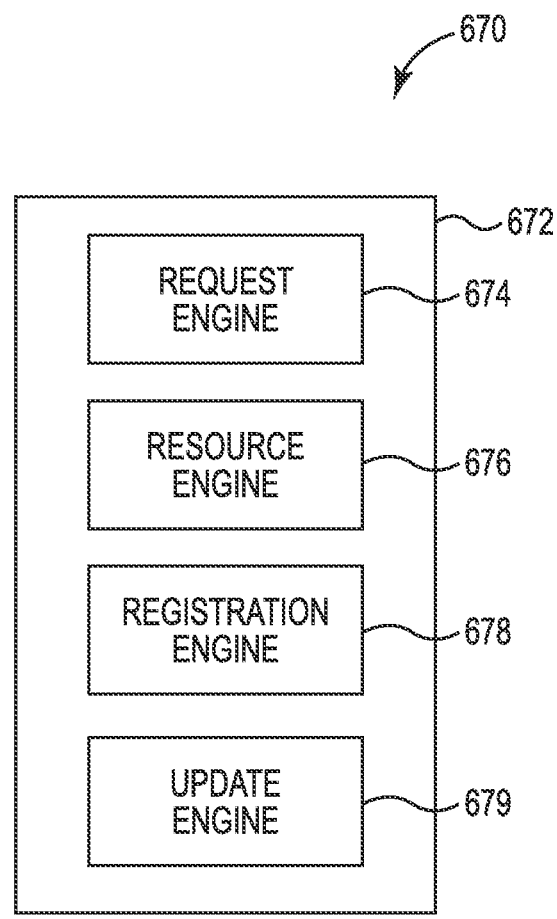
FIG. 6 illustrates a block diagram of an example of a system for providing resources according to the present disclosure.

FIG. 6 illustrates a block diagram of an example of a system 670 for providing resources according to the present disclosure. The system 670 can include a computing system 672, and/or a number of engines 674, 676, 678, 679. The computing system 672 can include the number of engines, e.g., request engine 674, resource engine 676, registration engine 678, update engine 679 etc. The computing system 672 can include additional or fewer engines than illustrated to perform the various functions described herein.

The number of engines can include a combination of hardware and programming that is configured to perform a number of functions described herein, e.g., register an instantiated first resource as a resource provider, etc. The programming can include program instructions, e.g., software, firmware, etc., stored in a memory resource, e.g., machine readable medium, etc. as well as hard-wired program, e.g., logic.

The request engine 674 can include hardware and/or a combination of hardware and programming to receive a request from an application for a first resource at a resource provider. In a number of examples, the request can be received at run time. In a number of examples, the request can be processed during development.

The resource engine 676 can include hardware and/or a combination of hardware and programming to provide, by the resource provider, a first reference of an instantiated first resource to the application. The first reference can be provided at run time.

The registration engine 678 can include hardware and/or a combination of hardware and programming to register the instantiated first resource as a different resource provider to provide a number of resources. In a number of examples the registration can occur at run time. The different resource provider can be registered with the resource provider that created the instantiated first resource, the application, and/or a managing engine that manages the resource providers and/or the instantiated resources.

Creating instantiated resources and registering the resource providers at run time provides flexibility in providing instantiated resources to an application, e.g., consumer. For example, if an application requests a number of resources, then providing instantiated resources at run time and registering the resource providers that are associated with the instantiated resources can conserve instantiated resources and it can allow more instantiated resources to be provided to an application and/or a number of applications because the instantiated resources can be wholly utilized before a new resource is instantiated. Having the ability to instantiate resources and to register resource providers that are associated with the instantiated resources allows for less instantiated resources to be used as compared to instantiating resources without creating resource providers from the instantiated resources because instantiated resources are wholly utilized before new resources are instantiated when instantiated resources are partitioned via an associated resource providers.

The different resource provider can register a number of capabilities and/or resource offerings that the instantiated first resource provides. The different resource provider can register a type of the instantiated first resource, among other descriptions of the instantiated first resource. Other descriptions can include commands that the instantiated first resource accepts and/or communication protocols. The instantiated first resource can receive commands to provide a number of capabilities.

The update engine 679 can include hardware and/or a combination of hardware and programming to update a number of building blocks. Updating a number of building blocks can include propagating a change to one of the number of building blocks to a portion and/or all of the number of building blocks.

Figure 7:
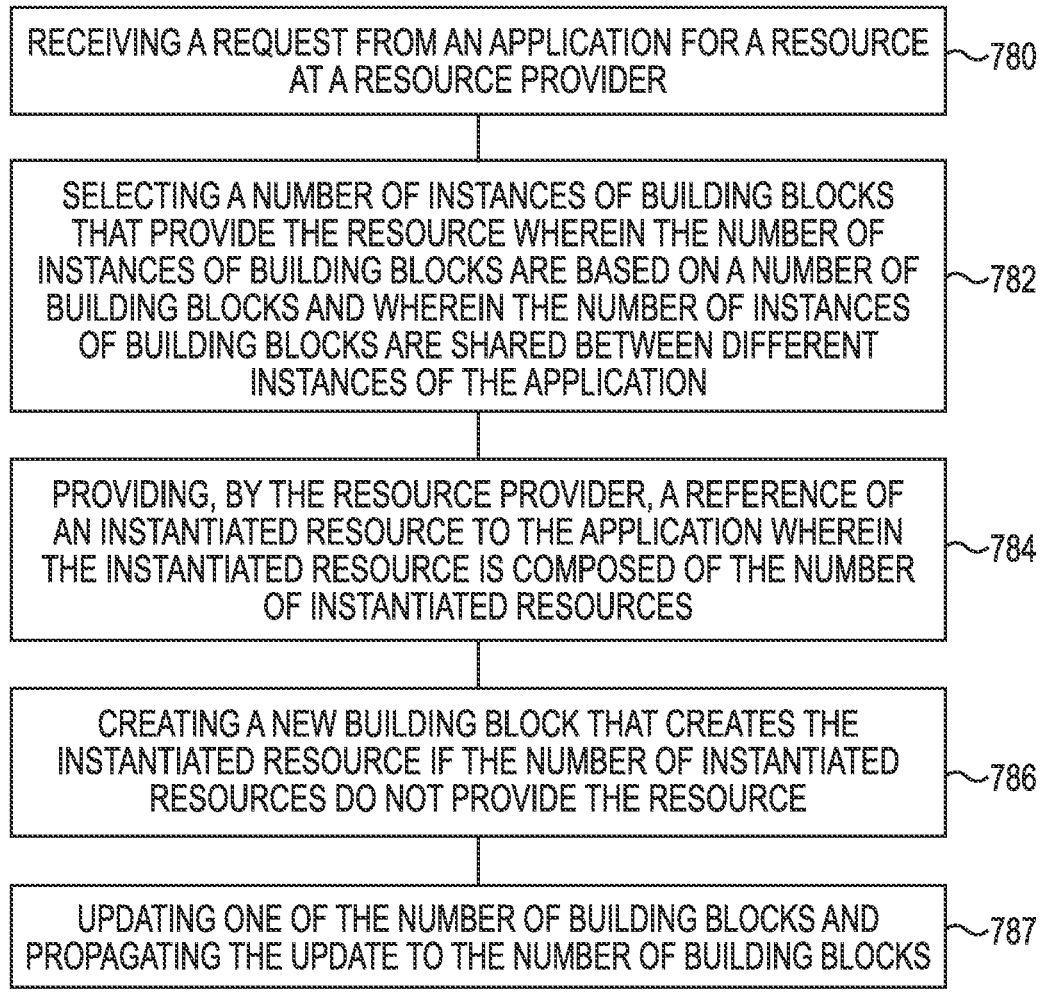
FIG. 7 illustrates a flow diagram of an example of a method for providing resources according to the present disclosure.

FIG. 7 illustrates a flow diagram of an example of a method for providing resources according to the present disclosure. At 780, a request from an application for a service can be received at a resource provider. It can be determined if the existing resource providers can provide a service that is associated with the request.

At 782, a number of instances of building blocks that provide the service can be selected if the associated resource providers can provide the service. The number of instances of building blocks can be used and/or shared by different instances of the application. In a number of examples, a number of instances of the application can reference a single consumer.

At 784, a reference of an instantiated resource can be provided to the application. The instantiated resource can be composed of a number of instances of the number of building blocks. For example, the instantiated resource can be a server and the number of instances of the number of building blocks can be hardware and/or software that support the operation of the server.

In a number of examples, selecting a number of instances of building blocks can include establishing a number of dependencies between the number of instances of building blocks and the instantiated resource. A number of dependencies can be established based on a topology. A topology can define how the instances of building blocks are used to create the instantiated resource. For example, the server, e.g. instantiated resource, can be at a first level and the hardware and/or software, e.g., instantiated building blocks, that supports the server can be at a second level. The levels in a topology can define the direction of the dependencies. For example a first level can depend on a second level. The levels and dependencies between levels are given as an example. Other levels and/or dependencies between levels can be used in a topology to use the building blocks to provide an instantiated service.

In a number of examples, an instantiated service is provided to the application. The instantiated service can include the topology, a number of dependencies between the instantiated resource and the number of instances of the building blocks, the instantiated resource, and/or the number of instances of the building blocks.

At 786, a new building block can be created to create the instantiated resource if the number of instantiated resources do not provide the service. The new building clock can be created when the policy, security, tenancy, and/or other contextual considerations preclude the creation of the instantiated resource from the number of instantiated resources.

At 787, a number of building blocks can be updated. For example, a change to one of the number of building blocks can be propagated to the other building blocks in the number of building blocks. A change can include any change to the building block, an instantiated resource, and an associated resource provider. For example, a change to a first instantiated resource that was partitioned to create a second instantiated resource can be propagated to the second instantiated resource and a resource provider and building block that are associated with the second instantiated resource.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A non-transitory machine-readable medium storing instructions executable by a machine to cause the machine to:

maintain a set of available resource providers in a form of a chain of building blocks, wherein each available resource provider in the set of available resource providers supports recursive instantiation by instantiating a particular resource of a particular resource type of a plurality of resource types to make available the particular resource in a form of a service via the instantiated particular resource and wherein the instantiated particular resource also serves as a resource provider;

receive a request to generate a first service provided by a resource provider of the set of available resource providers and provide a reference to an instantiated first resource that the resource provider instantiated;

receive a request to generate a second service provided by a new resource provider and provide a reference to an instantiated second resource that the instantiated first resource instantiated, the instantiated first resource being the new resource provider;

support the recursive instantiation of additional instantiated resources that also serve as resource providers by partitioning the instantiated first resource to create the instantiated second resource if the instantiated first resource is capable of providing the second service, wherein the instantiated second resource supports further recursive instantiation and partitioning;

make available the instantiated first resource for further partitioning in the chain of building blocks by adding the new resource provider to the set of available resource providers; and update one of the chain of building blocks and propagate the update to the chain of building blocks.

2. The medium of claim 1, wherein the instructions executable to update one of the chain of building blocks include instructions to manage the lifecycle of the first service.

3. The medium of claim 2, wherein the instructions executable to manage the lifecycle of the first service include instructions to update the availability of the chain of building blocks.

4. The medium of claim 1, wherein the instructions are executable to register a status of an availability of the instantiated second resource for further partitioning in the chain of building blocks.

5. The medium of claim 1, wherein the instructions executable to partition the instantiated first resource include instructions to support isolated access to each of the partitions.

6. The medium of claim 1, wherein the instructions executable to partition the instantiated first resource include instructions to provide each of a number of partitions of the instantiated first resource as instantiated resources to a number of different instances of an application.

7. The medium of claim 1, wherein the plurality of resource types include one or more of a database type, a server type, a network connection type, and an operating system type.

8. A system comprising:
a processing resource; and
non-transitory computer-readable media having stored therein instructions, which when executed by the processing resource cause the processing resource to:
maintain a set of available resource providers in a form of a chain of building blocks, wherein each available resource provider in the set of available resource providers supports recursive instantiation by instantiating a particular resource of a particular resource type of a plurality of resource types to make available the particular resource in a form of a service via the instantiated particular resource and wherein the instantiated particular resource also serves as a resource provider;

receive a request to generate a first service provided by a resource provider of the set of available resource providers and provide a reference to an instantiated first resource that the resource provider instantiated;

receive a request to generate a second service provided by a new resource provider and provide a reference to an instantiated second resource that the instantiated first resource instantiated, the instantiated first resource being the new resource provider;

support the recursive instantiation of additional instantiated resources that also serve as resource providers by partitioning the instantiated first resource to create the instantiated second resource if the instantiated first resource is capable of providing the second service, wherein the instantiated second resource supports further recursive instantiation and partitioning;

make available the instantiated first resource for further partitioning in the chain of building blocks by adding the new resource provider to the set of available resource providers; and update one of the chain of building blocks and propagate the update to the chain of building blocks.

9. The system of claim 8, wherein the instructions that cause the processing resource to update one of the chain of building blocks include instructions to manage the lifecycle of the first service.

10. The system of claim 9, wherein the instructions that cause the processing resource to manage the lifecycle of the first service include instructions to update the availability of the chain of building blocks.

11. The system of claim 8, wherein the instructions further cause the processing resource to register a status of an availability of the instantiated second resource for further partitioning in the chain of building blocks.

12. The system of claim 8, wherein the instructions that cause the processing resource to partition the instantiated first resource include instructions to support isolated access to each of the partitions.

13. The system of claim 8, wherein the instructions that cause the processing resource to partition the instantiated first resource include instructions to provide each of a number of partitions of the instantiated first resource as instantiated resources to a number of different instances of an application.

14. The system of claim 8, wherein the plurality of resource types include one or more of a database type, a server type, a network connection type, and an operating system type.

15. A computer-implemented method comprising:
maintaining a set of available resource providers in a form of a chain of building blocks, wherein each available resource provider in the set of available resource providers supports recursive instantiation by instantiating a particular resource of a particular resource type of a plurality of resource types to make available the particular resource in a form of a service via the instantiated particular resource and wherein the instantiated particular resource also serves as a resource provider;

receiving a request to generate a first service provided by a resource provider of the set of available resource providers and provide a reference to an instantiated first resource that the resource provider instantiated;

receiving a request to generate a second service provided by a new resource provider and provide a reference to an instantiated second resource that the instantiated first resource instantiated, the instantiated first resource being the new resource provider;

supporting the recursive instantiation of additional instantiated resources that also serve as resource providers by partitioning the instantiated first resource to create the instantiated second resource if the instantiated first resource is capable of providing the second service, wherein the instantiated second resource supports further recursive instantiation and partitioning;

making available the instantiated first resource for further partitioning in the chain of building blocks by adding the new resource provider to the set of available resource providers; and updating one of the chain of building blocks and propagating the update to the chain of building blocks.

16. The method of claim 15, wherein said updating comprises managing the lifecycle of the first service.

17. The method of claim 15, further comprising registering a status of an availability of the instantiated second resource for further partitioning in the chain of building blocks.

18. The method of claim 15, wherein said partitioning the instantiated first resource comprises supporting isolated access to each of the partitions.

19. The method of claim 15, wherein said partitioning the instantiated first resource comprises providing each of a number of partitions of the instantiated first resource as instantiated resources to a number of different instances of an application.

20. The method of claim 15 wherein the plurality of resource types include one or more of a database type, a server type, a network connection type, and an operating system type.

* * * * *